United States Patent [19]

Hales

[11] Patent Number: 5,285,077
[45] Date of Patent: Feb. 8, 1994

[54] MAGNETIC RECORDING MEDIA DIFFERENTIATION SYSTEM AND METHOD WITH COLOR SENSORS

[75] Inventor: Ronald F. Hales, Roy, Utah

[73] Assignee: Iomega Corporation, Roy, Utah

[21] Appl. No.: 25,561

[22] Filed: Mar. 2, 1993

[51] Int. Cl.$^5$ ............... G01N 21/86; G01J 3/50; G11B 5/82
[52] U.S. Cl. ............... 250/559; 250/226; 250/227.23; 360/137
[58] Field of Search ............... 250/226, 227.23, 559, 250/561, 570; 356/402, 420, 425; 360/27, 135, 137, 134; 369/58

[56] References Cited

U.S. PATENT DOCUMENTS

| | | | |
|---|---|---|---|
| 3,614,453 | 10/1971 | Johnson | 250/561 |
| 4,095,696 | 6/1978 | Sherwood | 250/223 R |
| 4,096,949 | 6/1978 | Hoover et al. | 250/226 |
| 4,783,591 | 11/1988 | Sullivan | 250/227.23 |
| 5,021,645 | 6/1991 | Satula et al. | 250/223 R |
| 5,117,101 | 5/1992 | Moore et al. | 250/227.23 |

*Primary Examiner*—Michael Messinger
*Attorney, Agent, or Firm*—Woodcock Washburn Kurtz Mackiewicz & Norris

[57] ABSTRACT

A system for differentiating magnetic recording media of varying shades of black comprises a controller 10, first and second amplifiers 12A, 12B, and first and second fiber optic cables 14A, 14B. The sensitivity of the first fiber optic unit is adjusted such that it detects gamma ferric oxide media but not metal particle or barium ferrite media. The sensitivity of the second unit is adjusted such that it detects both barium ferrite and gamma ferric oxide media, but not metal particle media. The controller employs binary logic to determine which type of media is being viewed by the fiber optic units.

7 Claims, 1 Drawing Sheet

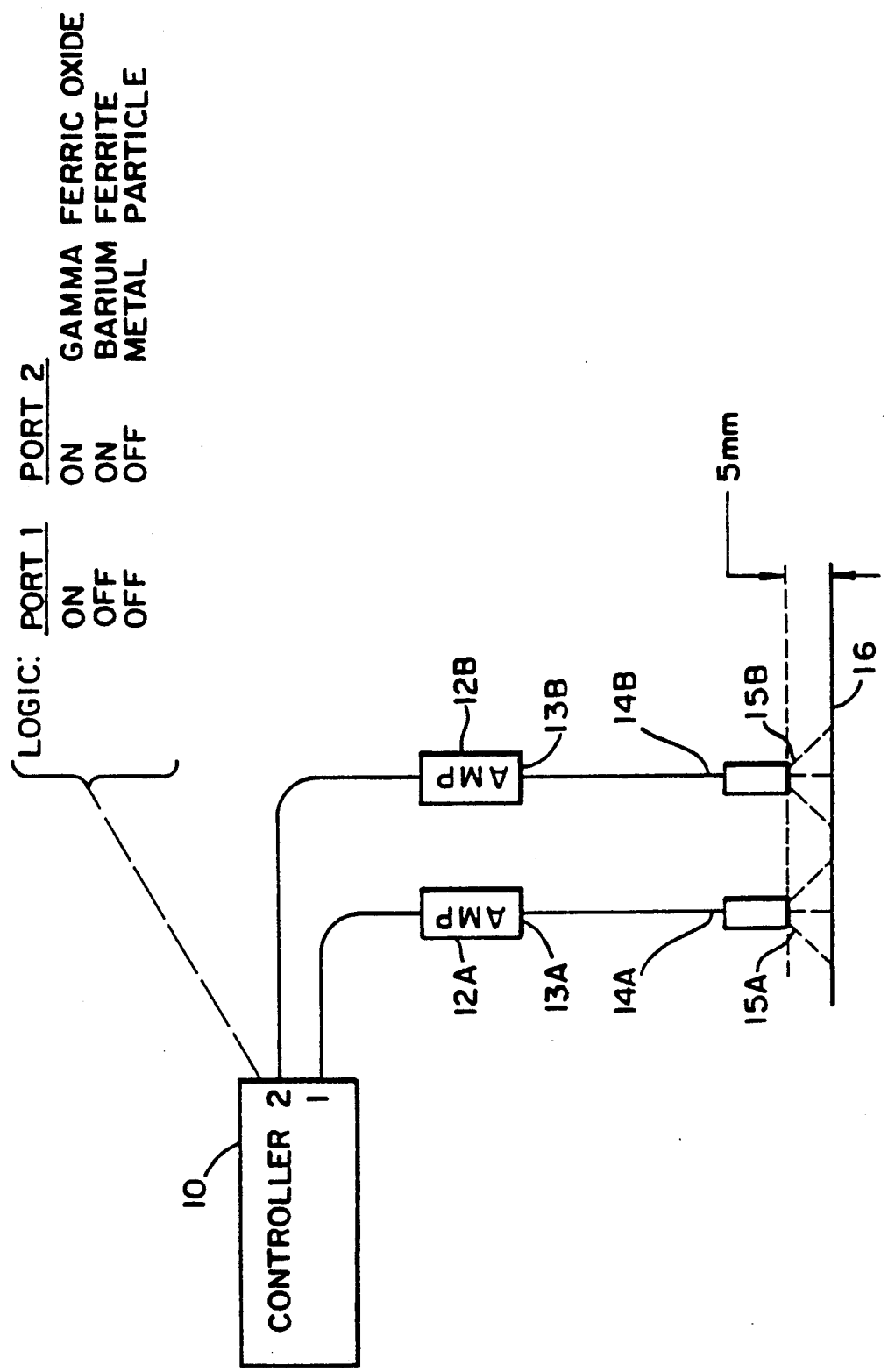

MAGNETIC RECORDING MEDIA DIFFERENTIATION SYSTEM AND METHOD WITH COLOR SENSORS

FIELD OF THE INVENTION

The present invention relates generally to magnetic recording media, and more particularly to a system for differentiating magnetic recording media. A preferred application of the present invention involves a system for differentiating gamma ferric oxide, barium ferrite, and metal particle recording media in a manufacturing environment.

BACKGROUND OF THE INVENTION

Historically, magnetic recording media evolved from metal tapes to magnetic oxide particles held in an organic binder and carried by a polymer tape substrate. Particulate recording tape continues to be the dominant tape medium, with countless refinements introduced over the last several decades. However, a need for rapid access to stored data has developed with the growth of the computer industry. The sequential access of information stored on tape is too slow for many applications. Plated metal films on spinning drums were used for a time. The use of rotating rigid disks replaced drum storage since disks could be more easily coated and could be stacked and recorded on two sides, thus increasing the volume storage capacity compared with drums. Presently, particulate media dominate the disk as well as the tape industry. With the appearance of mini- and microcomputers, a third form of magnetic storage grew to major proportions, namely the flexible (floppy) disk. This technology is also dominated by particulate media.

The most commonly used magnetic media are particles of gamma ferric oxide. Other particles that are being used for more advanced applications include cobalt-modified gamma ferric oxide, chromium dioxide, and metal particles. In addition, barium ferrite has recently received increased interest in connection with its use in recording media for perpendicular recording. For example, next-generation camera-type or improved quality home video, digitally encoded audio, and professional video recording systems are expected to go to wavelengths as short as 0.5 micrometers. This requires the high remanence and coercivity values found with metal particle tapes. Barium ferrite platlettes, oriented for perpendicular recording, lend themselves to an extremely flat frequency response which may result in similar output levels as those of metal particle tapes at the target wavelengths below 0.5 micrometers. See C. Denis Mee et al., *Magnetic Recording*, Vol. 1: *Technology*, (1987).

There is presently a need for a system having the ability to discern the difference between various types of magnetic recording media, including ferric oxide, barium ferrite, and metal particle recording media. Such a system would allow a manufacturer to "mistake proof" assembly and test stations that process multiple media types. Other applications, e.g., in a tape playback apparatus, can also be envisioned.

SUMMARY OF THE INVENTION

The present invention fulfills the aforementioned need by providing a system and method for automatically differentiating magnetic recording media of different compositions. The present invention is based on the recognition that different media types are typically different shades of black. The invention employs color discrimination to differentiate recording media falling into one of a number of prescribed categories. Preferred embodiments of the present invention employ two or more color discriminating sensors having sensitivities which are set at predetermined color or shade transition points. This embodiment employs binary logic to interpret the sensor signals and distinguish different media types.

According to the present invention, a system for differentiating magnetic recording media (e.g., of varying shades of black) comprises a controller including first and second input ports, the controller programmed to signal the detection of one of three categories of record media based upon input signals received at the input ports; a first photoelectric sensor operatively coupled to the first input port, the first sensor having an adjustable sensitivity; and a second photoelectric sensor operatively coupled to the second input port, the second sensor having an adjustable sensitivity. According to the invention, the sensitivity of the first photoelectric sensor is adjusted such that the first sensor detects a first category of recording media but not second and third categories of recording media. The sensitivity of the second photoelectric sensor is adjusted such that the second sensor detects the first and second categories of recording media but not the third category of recording media.

In one preferred embodiment, the first category of recording media includes gamma ferric oxide magnetic disks, the second category of recording media includes barium ferrite magnetic disks, and the third category of recording media includes metal particle magnetic disks.

The present invention also encompasses systems comprising first sensor means comprising a first light receiving window for detecting reflections from a first recording medium characterized by a first reflectivity and producing a first signal indicative of the presence or absence, in the field of view, of the first recording medium; second sensor means comprising a second light receiving window for detecting reflections from the first recording medium and a second recording medium characterized by a second reflectivity and producing a second signal indicative of the presence or absence, in the field of view, of the first and second recording media; and controller means for receiving the first and second signals and determining whether either of the first or second recording media is present in the field of view.

The present invention further encompasses methods for operating a system to differentiate magnetic recording media. According to the invention, such methods comprise the steps of adjusting the sensitivity of a first photoelectric sensor such that the first sensor will detect a first category of recording media but not second and third categories of recording media; adjusting the sensitivity of a second photoelectric sensor such that the second sensor will detect the first and second categories of recording media but not the third category of recording media; placing a recording medium in one of the first, second, and third categories in a field of view of the first and second sensors; and identifying the type of recording medium in the field of view on the basis of signals generated by the first and second sensors.

Other features of the present invention are described below.

BRIEF DESCRIPTION OF THE DRAWING

The FIGURE schematically depicts one preferred embodiment of a system for differentiating magnetic recording media in accordance with the present invention.

DETAILED DESCRIPTION OF A PREFERRED EMBODIMENT

Referring to the FIGURE, a system in accordance with the present invention comprises a controller 10 having first 1 and second 2 input ports and first and second fiber photoelectric sensors coupled to the first and second input ports. The first fiber photoelectric sensor includes an amplifier 12A and a fiber optic cable 14A, the cable including a window portion 15A through which light reflected from a recording media 16 is received. Similarly, the second fiber photoelectric sensor comprises an amplifier 12B, a fiber optic cable 14B, and a window 15B. As shown, the magnetic recording medium 16 is placed in the field of view of the two windows, preferably at a spacing of approximately 5 millimeters. The respective amplifiers 12A, 12B include means 13A, 13B by which their sensitivities, or gain, can be adjusted. An example of a photoelectric sensor useful in practicing the present invention is available from the Keyence Corporation under Part Nos. FS2-60/FU-42.

According to the present invention, the sensitivity of the first unit is adjusted such that it detects the gamma ferric oxide media but it does not "see" the metal particle or barium ferrite media. The sensitivity of the second unit is adjusted such that it detects both barium ferrite and gamma ferric oxide media but not metal particle media. The controller 10 is programmed to determine the media type in accordance with the signals received at its ports 1 and 2. The following table depicts the logic employed by the controller.

| Port 1 | Port 2 | |
| --- | --- | --- |
| On | On | Gamma Ferric Oxide |
| Off | On | Barium Ferrite |
| Off | Off | Metal Particle |

Although a specific preferred embodiment of the present invention is described herein, it will be apparent to those skilled in the art that the true scope of the present invention is not so limited. Accordingly, the scope of protection of the following claims is intended to be unlimited by the presently preferred embodiments described herein, but only by the express limitations set forth in the following claims.

I claim:

1. A system for differentiating magnetic recording media of varying shades of black, comprising:
   (a) a controller comprising first and second input ports, said controller programmed to signal the detection of one of three categories of record media based upon input signals received at said input ports;
   (b) a first photoelectric sensor operatively coupled to said first input port, said first sensor having an adjustable sensitivity; and
   (c) a second photoelectric sensor operatively coupled to said second input port, said second sensor having an adjustable sensitivity;
   wherein the sensitivity of the first photoelectric sensor is adjusted such that said first sensor detects a first category of recording media but not second and third categories of recording media, and the sensitivity of the second photoelectric sensor is adjusted such that said second sensor detects said first and second categories of recording media but not said third category of recording media.

2. The system recited in claim 1, wherein said first category of recording media includes gamma ferric oxide magnetic disks, said second category of recording media includes barium ferrite magnetic disks, and said third category of recording media includes metal particle magnetic disks.

3. A system for differentiating magnetic recording media placed in a field of view of the system, comprising:
   (a) first sensor means comprising a first light receiving window for detecting reflections from a first recording medium characterized by a first reflectivity and producing a first signal indicative of the presence or absence, in said field of view, of said first recording medium;
   (b) second sensor means comprising a second light receiving window for detecting reflections from said first recording medium and a second recording medium characterized by a second reflectivity and producing a second signal indicative of the presence or absence, in said field of view, of said first and second recording media; and
   (c) controller means for receiving said first and second signals and determining whether either of said first or second recording media is present in said field of view.

4. The system recited in claim 3, wherein a sensitivity of the first sensor means is adjusted such that said first sensor means detects a first category of recording media but not second and third categories of recording media, and a sensitivity of the second sensor means is adjusted such that said second sensor means detects said first and second categories of recording media but not said third category of recording media.

5. The system recited in claim 4, wherein said first category of recording media includes gamma ferric oxide magnetic disks, said second category of recording media includes barium ferrite magnetic disks, and said third category of recording media includes metal particle magnetic disks.

6. A method for operating a system to differentiate magnetic recording media, the system comprising a controller comprising first and second input ports, a first photoelectric sensor operatively coupled to said first input port, and a second photoelectric sensor operatively coupled to said second input port, the method comprising the steps of:
   (a) adjusting the sensitivity of said first photoelectric sensor such that said first sensor will detect a first category of recording media but not second and third categories of recording media;
   (b) adjusting the sensitivity of said second photoelectric sensor such that said second sensor will detect said first and second categories of recording media but not said third category of recording media;
   (c) placing a recording medium in one of said first, second, and third categories in a field of view of said first and second sensors; and
   (d) identifying the type of recording medium in said field of view on the basis of signals generated by said first and second sensors.

7. The method recited in claim 6, wherein said first category of recording media includes gamma ferric oxide magnetic disks, said second category of recording media includes barium ferrite magnetic disks, and said third category of recording media includes metal particle magnetic disks.

* * * * *